(12) United States Patent
Kim et al.

(10) Patent No.: US 7,399,561 B2
(45) Date of Patent: Jul. 15, 2008

(54) COLOR FILTER SUBSTRATE AND METHOD OF FABRICATING THE SAME

(75) Inventors: Jang-Sub Kim, Suwon-si (KR); Yoon-Ho Kang, Yongin-si (KR); Byoung-Joo Kim, Anyang-si (KR); Seong-Gyu Kwon, Suwon-si (KR); Kwang-Ho Lee, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 11/471,358

(22) Filed: Jun. 20, 2006

(65) Prior Publication Data

US 2006/0286466 A1 Dec. 21, 2006

(30) Foreign Application Priority Data

Jun. 20, 2005 (KR) .................... 10-2005-0053103

(51) Int. Cl.
*G02B 5/20* (2006.01)
(52) U.S. Cl. ........................ 430/7; 347/107
(58) Field of Classification Search ............... None
See application file for complete search history.

(56) References Cited

U.S. PATENT DOCUMENTS

2004/0229139 A1* 11/2004 Tanaka et al. ............... 430/7
2006/0066779 A1* 3/2006 Kobayashi et al. .......... 349/106

FOREIGN PATENT DOCUMENTS

| JP | 2000-098127 | 4/2000 |
| JP | 2003-043238 | 2/2003 |
| KR | 1996-0042153 | 12/1996 |

OTHER PUBLICATIONS

Abstract and computer-generated translation of JP 2003-043238 A (Feb. 2003).*

* cited by examiner

*Primary Examiner*—John A. McPherson
(74) *Attorney, Agent, or Firm*—F. Chau & Associates, LLC

(57) ABSTRACT

A color filter substrate comprising a substrate, a light blocking layer on the substrate having a plurality of wells with bottoms that contact the substrate, and a plurality of channels between the wells, and a color layer material which fills the wells and channels.

17 Claims, 10 Drawing Sheets

COLOR FILTER SUBSTRATE AND METHOD OF FABRICATING THE SAME

CROSS-REFERENCE TO RELATED PATENT APPLICATION

This application claims priority to Korean Patent Application No. 2005-53103, filed on Jun. 20, 2005, in the Korean Intellectual Property Office, the disclosure of which is incorporated by reference herein.

BACKGROUND OF THE INVENTION

1. Technical Field

The present disclosure relates to a color filter substrate and a method of fabricating the color filter substrate. More particularly, the present disclosure relates to a color filter substrate having an improved uniformity and method of fabricating the same.

2. Discussion of the Related Art

An inkjet printing method is widely used as a method of forming a color filter layer. In such a method, openings are formed through a light blocking layer which is formed on a substrate, and a color ink is sprayed onto the substrate through the openings.

FIGS. 1A and 1B are sectional views illustrating a conventional method of forming a color filter layer.

Referring to FIGS. 1A and 1B, openings 3 are formed through a light blocking layer 2, which is formed on a substrate 1. A color ink 4 is sprayed onto the exposed substrate 1 through the openings 3 and not sprayed onto the light blocking layer 2. When the color ink 4 sprayed onto the exposed substrate 1 is cured under a predetermined temperature, a color filter layer 5 is formed on the substrate 1 as shown in FIG. 1B. However, the thickness of the color filter layer 5 is uneven due to the coffee stain effect. The coffee stain effect reveals that during drying of a liquid, the interaction of surface tension and evaporation may cause an uneven distribution of material left behind. For example, when the color ink 4 having a volatile solvent is cured, a portion of the color ink 4 making contact with the light blocking layer 2 evaporates more quickly than a portion of the color ink 4 that does not make contact with the light blocking layer 2. As a result, a color filter layer 5 is produced with an uneven thickness as shown in FIG. 1B.

SUMMARY OF THE INVENTION

In an exemplary embodiment of the present invention, a color filter substrate comprises a substrate, a light blocking layer, and a color layer material. The light blocking layer is formed on the substrate. The light blocking layer has a plurality of wells having bottoms that contact the substrate and a plurality of channels between the wells. A color layer material fills the wells and the channels. The wells may be arranged in a matrix of rows and columns. The color layer material in a column of the matrix may differ in color from an adjacent column of the matrix. The color layer material in a row of the matrix may differ in color from an adjacent row of the matrix.

In an exemplary embodiment of the present invention, a method of fabricating a color filter substrate is provided as follows. A light blocking layer is formed on a substrate and patterned to form a plurality of openings through the light blocking layer. A plurality of channels are formed on the light blocking layer between the openings to allow each of the openings to be connected to an adjacent opening thereto. A plurality of color layers is formed on the substrate exposed through the openings and on the channels of the light blocking layer between the openings. Each of the color layers connects the openings arranged in a same line such that the color layers are substantially parallel to each other.

Each of the color layers may have a different color from that of adjacent color layers thereto. A color ink is sprayed onto the substrate exposed through the openings and onto the channels of the light blocking layer between the openings to form the color layers. The openings may be substantially simultaneously formed with the channels using a single mask. The openings may be arranged in a matrix shape and the color layers connect the openings arranged either in a vertical direction or in a horizontal direction. The openings formed through the light blocking layer are connected to each other through the channels, so that the color ink sprayed onto the substrate exposed through the openings and onto the light blocking layer may flow between the openings, thereby forming a color layer with a uniform thickness.

According to an exemplary embodiment of the present invention, a method of fabricating a color filter substrate includes forming a light blocking layer on a substrate, patterning the light blocking layer to form a plurality of wells through the light blocking layer, forming a plurality of channels in the light blocking layer between the wells to allow each of the wells to be connected to adjacent wells, and filling the channels and wells with a color layer material.

The wells may be arranged in a matrix of rows and columns. The color layer material in a column of the matrix may differ in color from an adjacent column of the matrix. The color layer material in a row of the matrix may differ in color from an adjacent row of the matrix. The color layer material may be applied by spraying a colored ink onto the substrate exposed by the wells and the channels between the wells. The wells and channels may be formed together using a single mask.

BRIEF DESCRIPTION OF THE DRAWINGS

The above and other features of the present invention will become readily apparent by describing in detail exemplary embodiments thereof with reference to the attached drawings in which.

DETAILED DESCRIPTION OF EXEMPLARY EMBODIMENTS

It will be understood that when an element or layer is referred to as being "on", "connected to" or "coupled to" another element or layer, it can be directly on, connected or coupled to the other element or layer, or intervening elements or layers may be present.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Hereinafter, the exemplary embodiments of the present invention will be explained in detail with reference to the accompanying drawings.

Figure 1A:
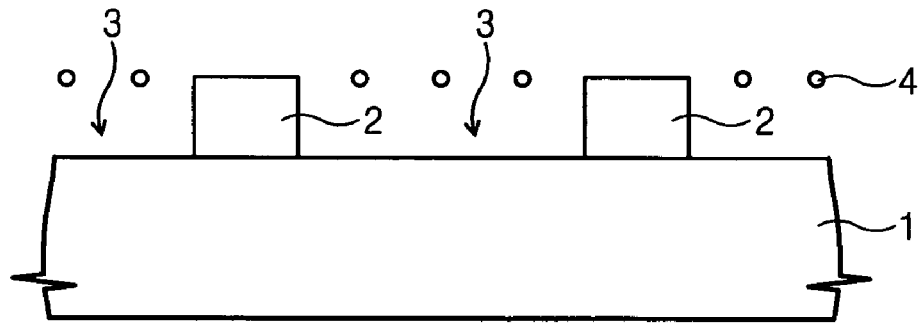
FIGS. 1A and 1B are sectional views illustrating a conventional method of forming a color filter layer.
Figure 1B:
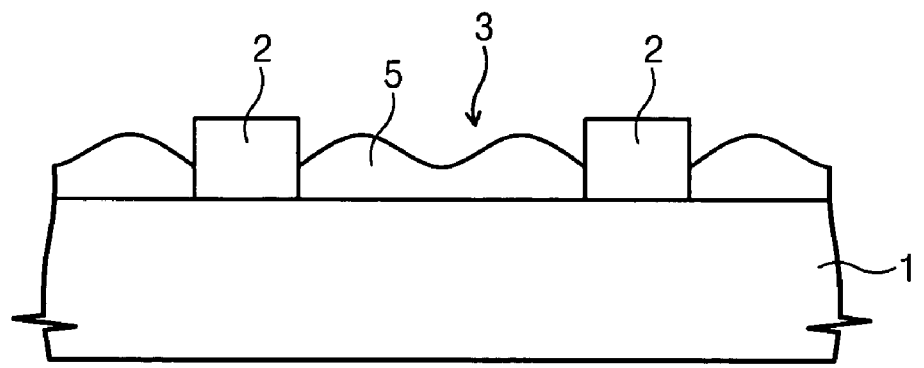
Figure 2:
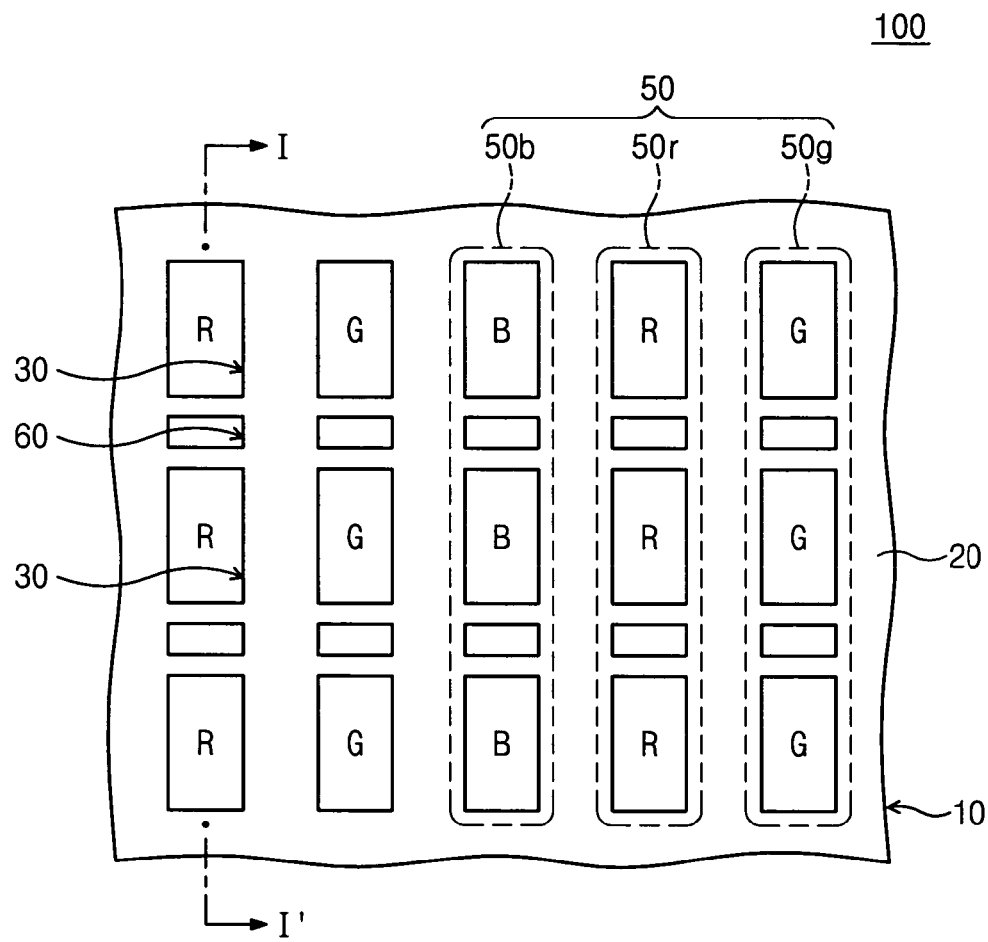
FIG. 2 illustrates a color filter substrate according to an exemplary embodiment of the present invention.

FIG. 2 illustrates a color filter substrate according to an exemplary embodiment of the present invention.

Referring to FIG. 2, a color filter substrate 100 includes a substrate 10, a light blocking layer 20, and a color layer 50. The color layer 50 displays a predetermined color. The light blocking layer 20 is formed on the substrate 10. Openings 30 corresponding to pixels are formed on the light blocking layer 20 to partially expose the substrate 10. The color layer 50 is formed on the substrate 10 exposed through the openings 30. The light blocking layer 20 formed on the substrate 10 prevents light interference between the pixels.

The color layer 50 may display various color layers, for example, a red color layer 50r, a green color layer 50g and a blue color layer 50b. The red, green and blue color layers 50r, 50g and 50b are alternately arranged with each other and each of the red, green and blue color layers 50r, 50g and 50b is arranged in a line. The light blocking layer 20 has channels 60 positioned between all wells that makeup the same color layer of the red, green and blue color layers 50r, 50g and 50b.

Figure 3A:
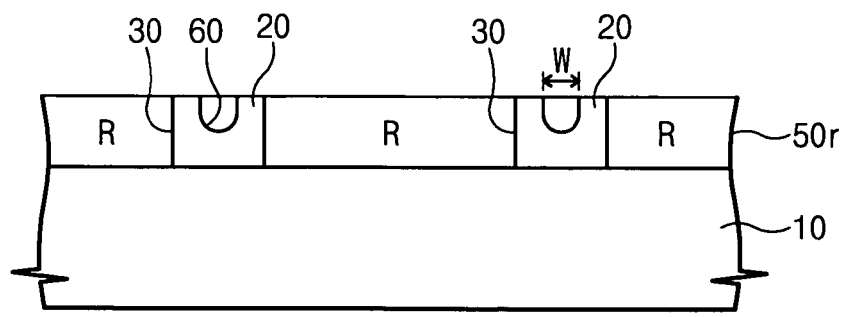
FIG. 3A is a cross-sectional view taken along line I-I' of FIG. 2.
Figure 3B:
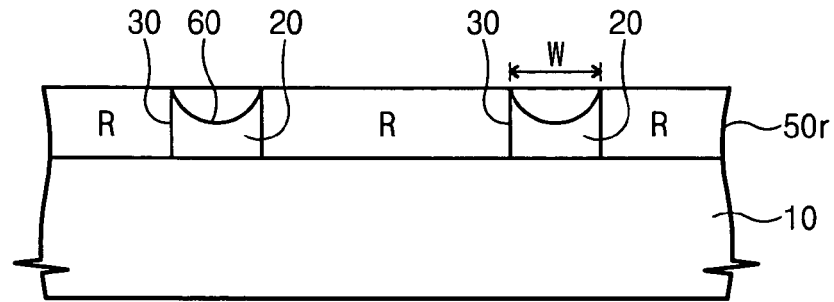
FIG. 3B is a cross-sectional view illustrating an exemplary embodiment of the color filter substrate shown in FIG. 3A.

FIG. 3A is a cross-sectional view taken along a line I-I' of FIG. 2. FIG. 3B is a cross-sectional view illustrating an exemplary embodiment of the color filter substrate shown in FIG. 3A.

Referring to FIGS. 2 and 3A, the light blocking layer 20 through which the wells 30 are formed, is formed on the substrate 10. The channels 60 are formed on the light blocking layer 20 between all wells that makeup the same color layer of the red, green and blue color layers 50r, 50g and 50b. Using the inkjet method, as shown in FIG. 3A, the red color layer 50r is formed on the substrate 10 exposed through the openings 30 so the red color layer 50r may be formed with a uniform thickness.

When the red, green and blue color layers 50r, 50g and 50b are formed by the inkjet method, the channels 60 may have variable sizes and shapes. The channels 60 may have a concave shape such as a U-shape, a V-shape, etc. In addition, the channels 60 may have a depth that is substantially similar to or shallower than a thickness of the light blocking layer 20. The depth of the channels 60 are determined in consideration of a function of the light blocking layer 20 that prevents light interference between adjacent pixels to improve a contrast. For example, when the light blocking layer 20 has a thickness of about 1.5 micrometers, the channels 60 may have a thickness above about 0.1 micrometers to below about 1.5 micrometers.

In FIG. 3A, the channels 60 have a width W suitable for allowing the color ink to flow into adjacent pixels. When the width W of the channels 60 is too small, the color ink sprayed onto the light blocking layer 20 may not flow into adjacent pixels because a distance between adjacent openings has become too large.

As shown in FIG. 3B, the channels 60 may have substantially the same width W as the distance between adjacent openings, so that the channels 60 may be connected with an adjacent opening thereto. The channels 60 may have a concave shape such as a U-shape, a V-shape, etc.

FIGS. 4A to 4D are cross-sectional views illustrating a method of fabricating the color filter substrate shown in FIG. 2. In FIGS. 4A to 4D, the same reference numerals denote the same elements in FIGS. 3A and 3B.

Figure 4A:
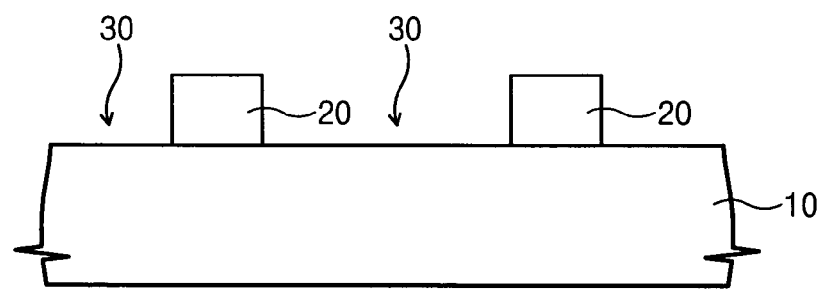
FIGS. 4A to 4D are cross-sectional views illustrating a method of fabricating the color filter substrate shown in FIG. 2 according to an exemplary embodiment of the invention.

Referring to FIG. 4A, the light blocking layer 20 is formed on the substrate 10. The substrate 10 may be a transparent glass substrate and the light blocking layer 20 may be a metal layer such as chromium (Cr) or a polymer resin such as a black-colored photoresist material. When the light blocking layer 20 is made of a metal layer, the layer is formed on the substrate 10 and the openings 30 may be patterned by a photolithography process. When the light blocking layer 20 is made of a polymer resin, the resin is coated onto the substrate 10 and the openings 30 may be patterned by partially removing the polymer resin due to exposure/development of the resin.

Figure 4B:
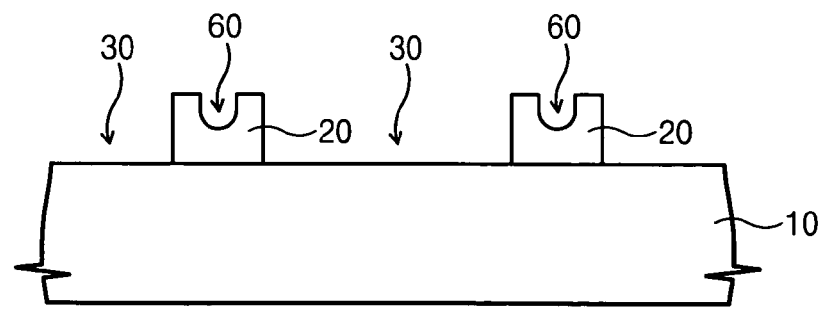

Referring to FIG. 4B, the channels 60 are formed on the light blocking layer 20 between the openings 30. The channels 60 may be formed by a photography process when the openings 30 are formed.

Figure 4C:
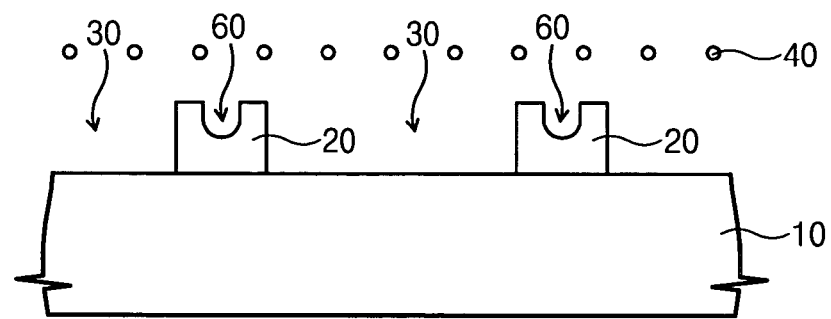

Referring to FIG. 4C, the color ink 40 is sprayed onto portions of the substrate 10 exposed by the openings 30. The color ink 40 includes pigment determining colors and a volatile solvent. The volatile solvent of the color ink 40 evaporates when the color ink 40 sprayed onto the substrate 10 is cured. The color ink 40 is divided into red, green and blue color inks. Each of the red, green and blue color inks is separately sprayed onto the substrate 10 along a subset of the openings 30 that are arranged in the same direction.

As shown in FIG. 4C, the color ink 40 is sprayed not only onto the substrate 10 exposed through the openings 30 but also onto the light blocking layer 20 between the openings 30, thereby forming the red, green and blue color layers 50r, 50g and 50b (refer to FIGS. 2, 3A and 3B) each with uniform thicknesses. In a conventional color filter substrate, the color ink is sprayed only onto the substrate exposed through the openings. As a result, when the color ink sprayed onto the substrate is cured, the volatile solvent of the color ink evaporates at a different rate in accordance with a region of the substrate exposed through the openings, thereby resulting in color layers with non-uniform thicknesses. However, when the color ink 40 is successively sprayed onto the substrate 10 exposed through the openings 30 and onto the light blocking layer 20 at which the channels 60 are formed, the color ink 40 may have a uniform thickness since the color ink 40 flows between the openings 30 through the channels 60 on the light blocking layer 20. Thus, the volatile solvent of the color ink 40 may be uniformly volatilized regardless of the regions onto which the color ink 40 is sprayed. The color ink 40 may be thickly sprayed onto the substrate 10 exposed through the openings 30 in consideration of a volume reduction of the sprayed color ink 40 when the volatile solvent of the sprayed ink 40 is volatilized.

When the color ink 40 is sprayed, the color ink 40 is applied not only onto the substrate 10 exposed through the openings 30, but also onto the light blocking layer 20 between the openings 30. In an exemplary embodiment of the invention, the light blocking layer 20 has a thickness of about 1.5 micrometers, the color ink 40 sprayed onto the exposed substrate 10 has a thickness of about 1.6 micrometers, and the color ink 40 sprayed onto the light blocking layer 20 has a thickness of about 1.0 micrometers. Thus, a sum of the thickness of the light blocking layer 20 and the thickness of the color ink 40 sprayed onto the light blocking layer 20 is about 2.5 micrometers which is shallower than a sum of the thickness of the light blocking layer 20 and the thickness of the color ink 40 sprayed onto the exposed substrate 10. This is because the color ink 40 sprayed onto the light blocking layer 20 has flowed to the openings 30 adjacent thereto.

The channels 60 formed on the light blocking layer 20 have a concave shape so the color ink 40 sprayed onto the light blocking layer 20 may flow to the openings 30 adjacent thereto.

Figure 4D:
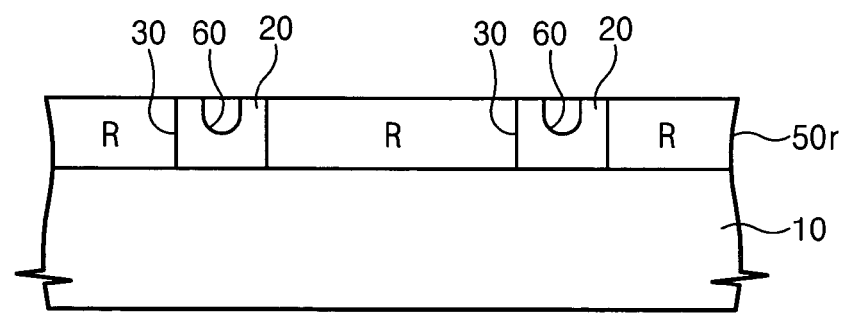

Referring to FIG. 4D, when the volatile solvent of the color ink 40 is volatilized under a predetermined temperature after the color ink 40 is sprayed, the red, green and blue color layers 50r, 50g and 50b may be formed on the substrate 10. The color ink 40 sprayed onto the exposed substrate 10 through the openings 30 may evaporate at the same rate regardless of the region exposed by the substrate 10 through the openings 30, so that the red, green and blue color layers 50r, 50g and 50b may each have uniform thicknesses.

FIGS. 5A to 5D are cross-sectional views illustrating a method of fabricating the color filter substrate shown in FIG. 2 according to an exemplary embodiment of the present invention. In FIGS. 5A to 5D, the same reference numerals denote the same elements in FIGS. 4A and 4D.

Figure 5A:
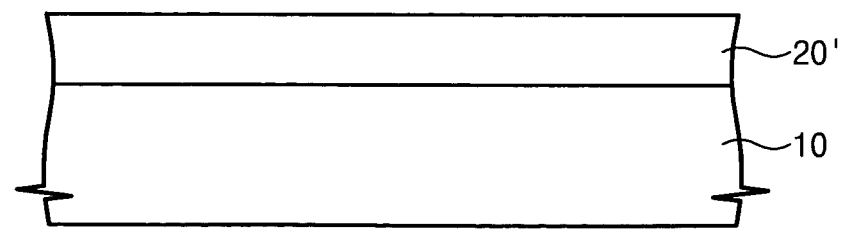
FIGS. 5A to 5D are cross-sectional views illustrating a method of fabricating the color filter substrate shown in FIG. 2 according to an exemplary embodiment of the present invention.

Referring to FIG. 5A, a layer 20', which serves as the light blocking layer 20, is formed on the substrate 10. The substrate 10 may be a transparent glass substrate and the light blocking layer 20 may be a black-colored photoresist material. The layer 20' for the light blocking layer 20 may be a positive type black-colored photoresist material.

Referring to 5B, the layer 20' is exposed to a light passed through a slit mask 70 having a different transmittance in accordance with regions thereof. The slit mask 70 has various regions through which the light passes. The light either does not pass or partially passes, so that the openings 30 and the channels 60 may be formed using a single mask. The slit mask 70 has a first transmission region 71, a second transmission region 72 and a non-transmission region 73. The first and second transmission regions 71 and 72 correspond to the openings 30 and the channels 60, respectively. The light substantially passes through the first transmission region 71 and partially passes through the second transmission region 72, meaning that the intensity of the light passing through the second transmission region 72 is less than the intensity of the light passing through the first transmission region 71. When the exposed layer 20' using the slit mask 70 is developed, a portion of the layer 20' corresponding to the first transmission region 71 is removed to form the openings 30 (refer to FIG. 5C) through the layer 20'. In addition, a portion of the layer 20' corresponding to the second transmission region 72 is partially removed to form the channels 60 (refer to FIG. 5C), while the portion of the layer 20' corresponding to the first transmission region 71, and a portion of the layer 20' corresponding to the non-transmission region 73 remain to form the light blocking layer 20 between the openings 30. The channels 60 formed on the light blocking layer 20 may have various concave shapes such as a U-shape, a V-shape, etc., thereby allowing the second transmission region 72 to have various transmittances.

Figure 5B:
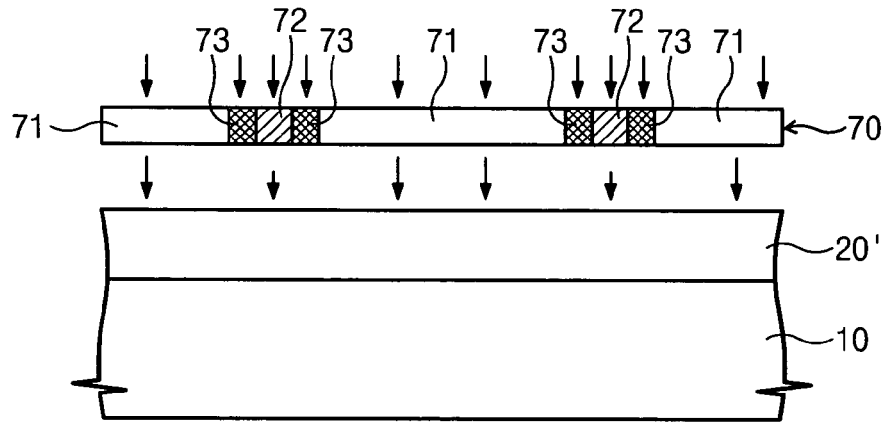
Figure 5C:
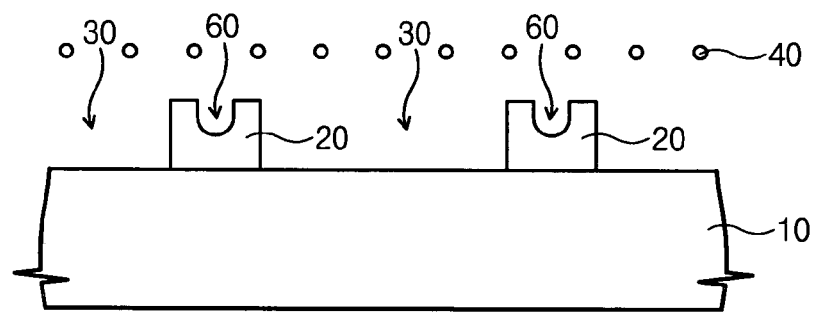

Referring to FIG. 5C, the color ink 40 is sprayed onto the substrate 10 exposed through the openings 30 formed through the light blocking layer 20 and onto the light blocking layer 20 on which the channels 60 are formed along the openings 30. The color ink 40 sprayed onto the light blocking layer 20 on which the channel 60 is formed may partially flow to the openings 30 adjacent thereto, thereby uniformly distributing the color ink 40 onto the substrate 10 exposed through the openings 30.

Figure 5D:
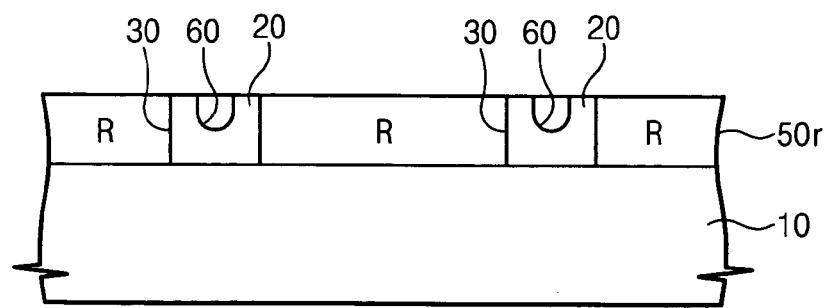

The color ink 40 sprayed onto the substrate 10 exposed through the openings 30 is cured under a predetermined temperature to form the red color layer 50r as shown in FIG. 5D. Although processes for the light blocking layer shown in FIG. 5B are different from those for the light blocking layer shown in FIGS. 4A and 4B, the color filter substrate shown in FIG. 5D may have the same structure as the color filter substrate shown in FIG. 4D.

Figure 6:
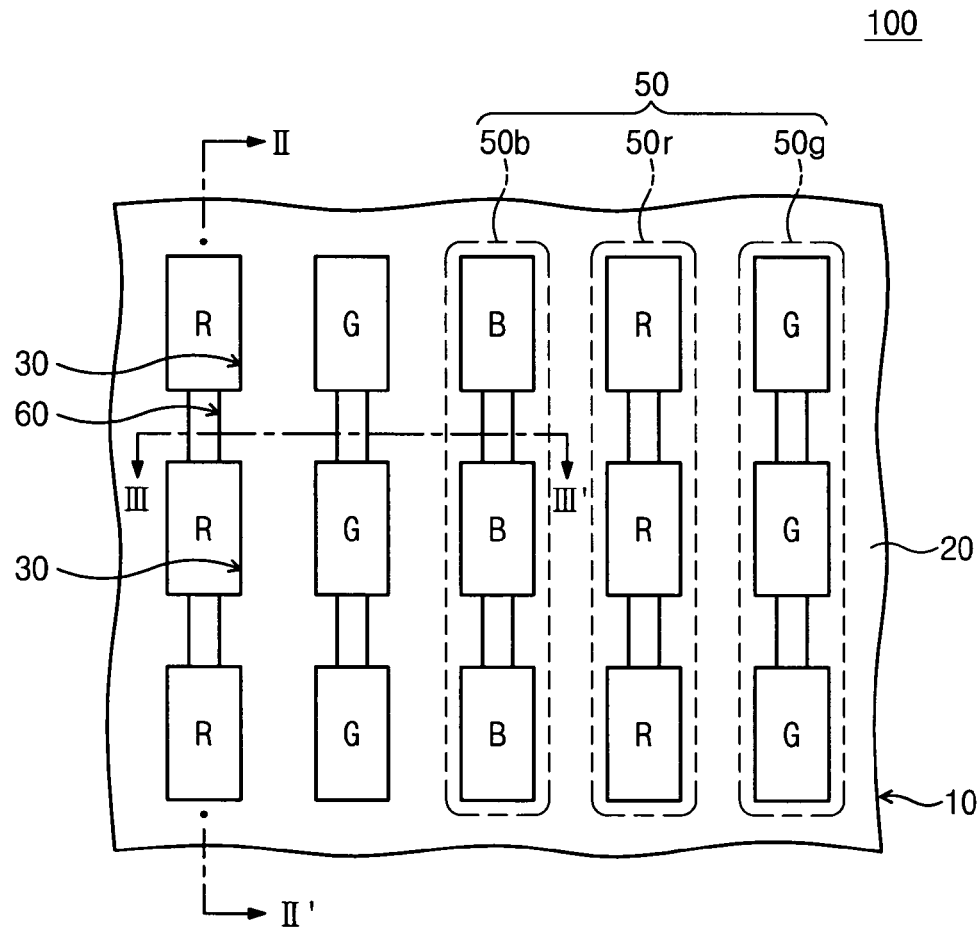
FIG. 6 illustrates a color filter substrate according to an exemplary embodiment of the present invention.
Figure 7:
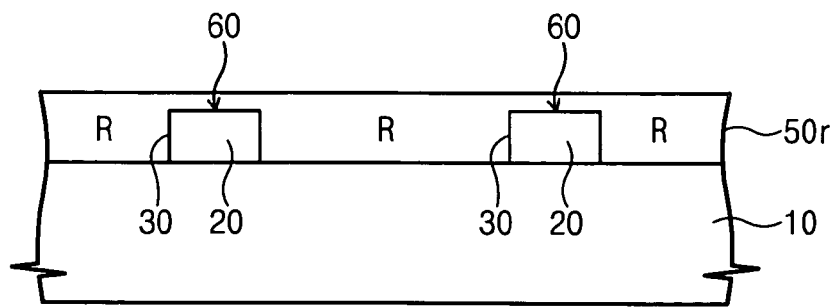
FIG. 7 is a cross-sectional view taken along line II-II' of FIG. 6.
Figure 8:
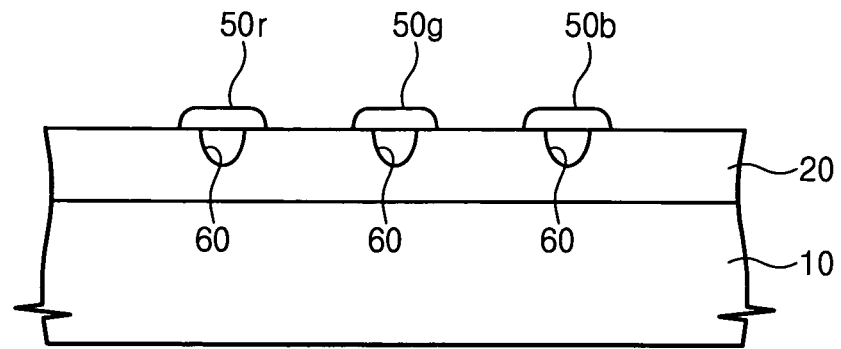
FIG. 8 is a cross-sectional view taken along line III-III' of FIG. 6.

FIG. 6 illustrates a color filter substrate according to an exemplary embodiment of the present invention. FIG. 7 is a cross-sectional view taken along line II-II' of FIG. 6. FIG. 8 is a cross-sectional view taken along line III-III' of FIG. 6. In FIGS. 6 to 8, the same reference numerals denote the same elements in FIGS. 2A and 3B.

Referring to FIGS. 6 to 8, a color filter substrate 100 includes a substrate 10, a light blocking layer 20 and a color layer 50. The light blocking layer 20, through which openings 30 are formed, is formed on the substrate 10 to partially expose the substrate 10. The color layer 50 is formed on the exposed substrate 10 through the openings 30.

The color layer 50 may display various color layers, for example, a red color layer 50r, a green color layer 50g and a blue color layer 50b. The red, green and blue color layers 50r, 50g and 50b are alternately arranged with each other, and each of the red, green and blue color layers 50r, 50g and 50b is arranged in a line. The light blocking layer 20 is provided with channels 60 positioned between wells that makeup the same color layer of the red, green and blue color layers 50r, 50g and 50b.

The channels 60 are formed on the light blocking layer 20 such that the openings 30 that makeup the same color layer are connected to each other. The channels 60 may have a concave shape such as a U shape, a V shape, etc.

When a red color ink is sprayed along a line where a corresponding color layer will be formed, the red color ink is sprayed onto the exposed substrate 10 through the openings 30 and onto the light blocking layer 20 on which the channels 60 are formed. The red color ink sprayed onto the light blocking layer 20 flows to adjacent openings 30 through the channels 60, so that the red color ink sprayed onto the exposed substrate 10 may be formed to have a uniform thickness.

Thus, when the red color ink sprayed onto the substrate 10 is cured, the volatile solvent of the red color ink is uniformly volatilized without regard to regions onto which the red color ink is sprayed. As a result, the red color layer 50r may be formed to have a uniform thickness as shown in FIGS. 7 and 8. The green and blue color layers 50g and 50b are formed by the same method as the red color layer 50r, thereby uniformly forming the green and blue color layers 50g and 50b.

FIGS. 9A and 9B, 10A and 10B, 11A and 11B and 12A and 12B are cross-sectional views illustrating a method of fabricating the color filter substrate of FIG. 6 according to an exemplary embodiment of the invention.

Figure 9A:
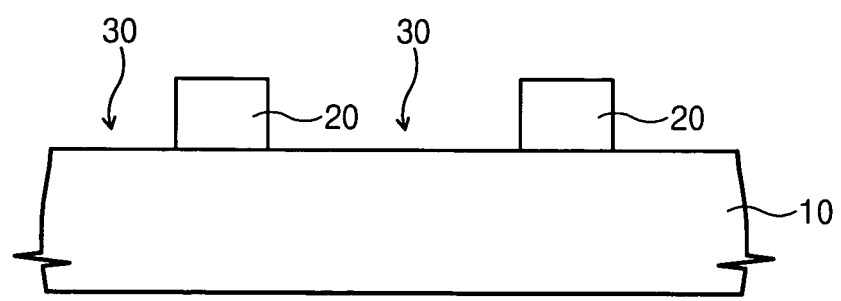
FIGS. 9A and 9B, 10A and 10B, 11A and 11B and 12A and 12B are cross-sectional views illustrating a method of fabricating the color filter substrate of FIG. 6 according to an exemplary embodiment of the invention.
Figure 9B:
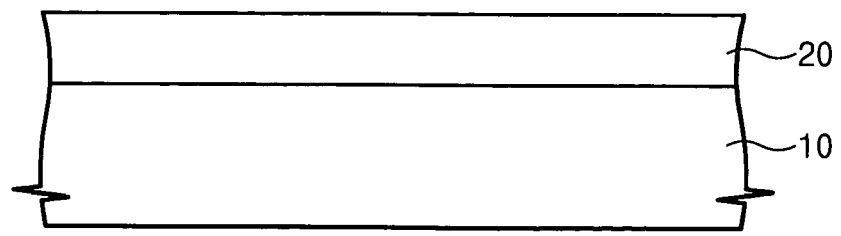

Referring to FIGS. 9A and 9B, the light blocking layer 20 through which the openings 30 are formed, is formed on the substrate 10.

Figure 10A:
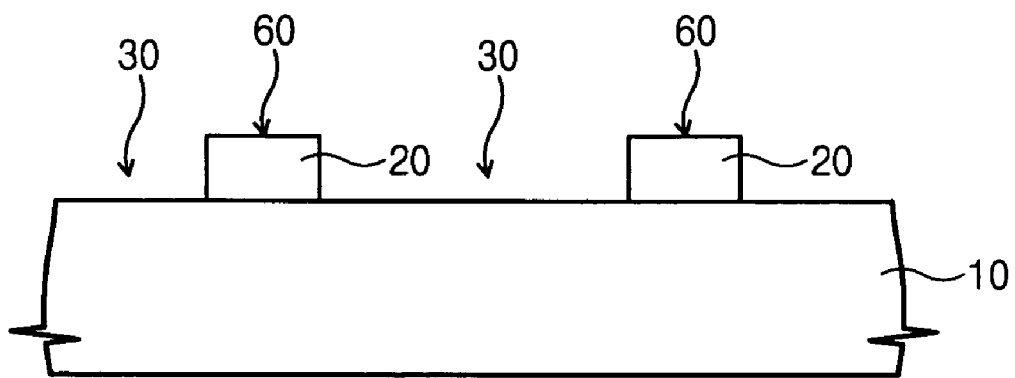
Figure 10B:
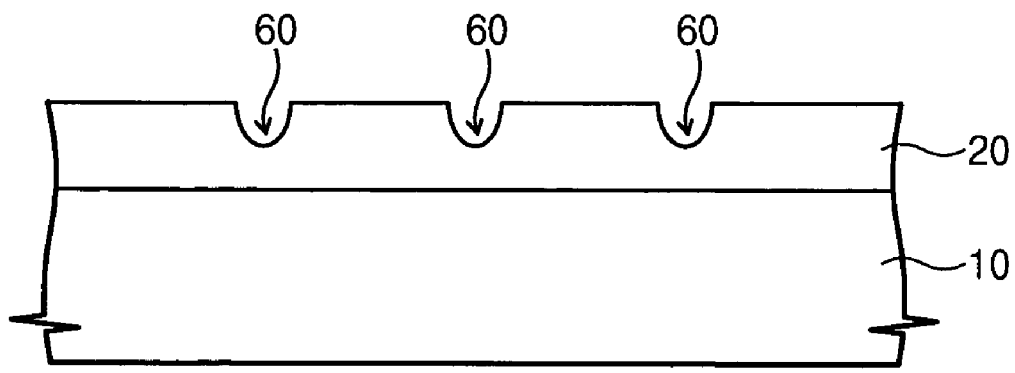

As shown in FIGS. 10A and 10B, the light blocking layer 20 is patterned to form the channels 60 that are positioned between the openings 30 and to connect the adjacent openings 30. Although not shown in FIGS. 10A and 10B, the openings 30 and the channels 60 may be formed together by a photolithography process using a slit mask.

Figure 11A:
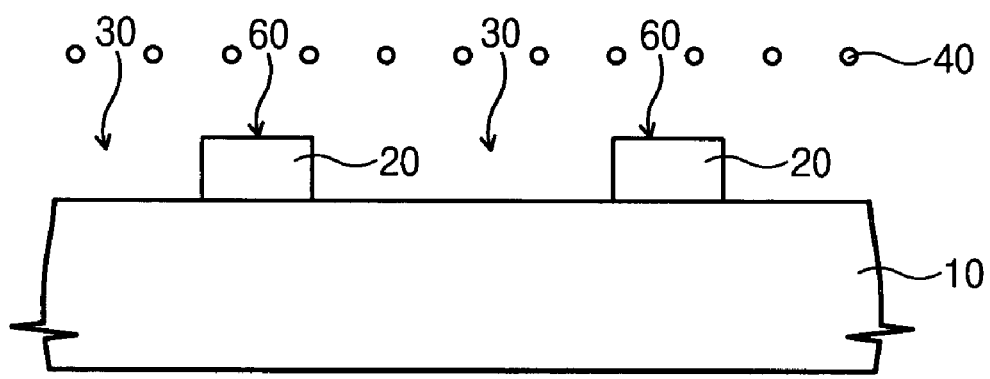
Figure 11B:
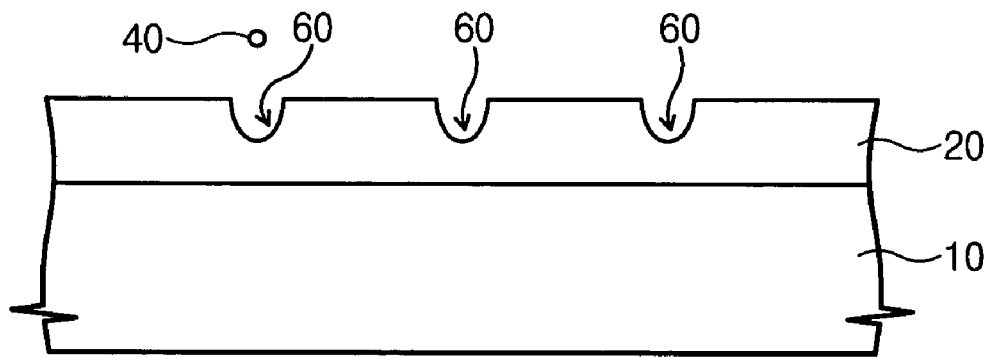

Referring to FIGS. 11A and 11B, the red color ink is sprayed onto the exposed substrate 10 through the openings 30 and onto the light blocking layer 20 on which the channels 60 are formed. The color ink may be sprayed in order of red, green and blue color inks.

Figure 12A:
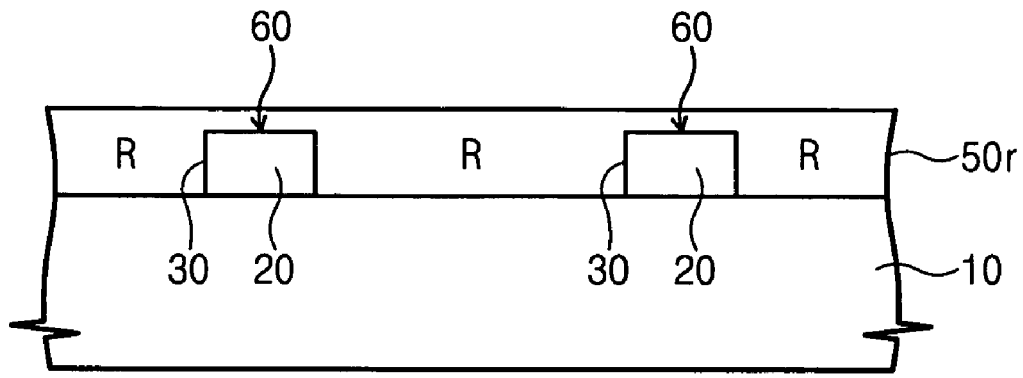
Figure 12B:
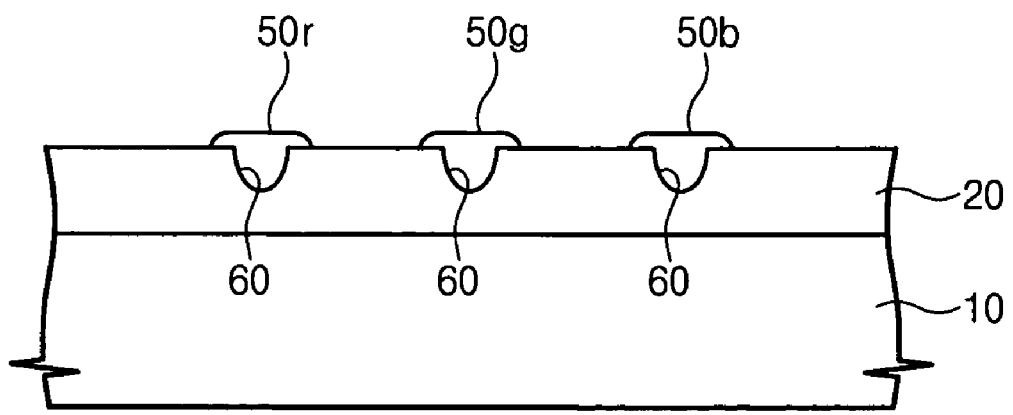

Referring to FIGS. 12A and 12B, the red color ink sprayed onto the substrate 10 and the light blocking layer 20 is cured to form the red color layer 50r. The red color ink sprayed onto the exposed substrate 10 flows to the adjacent openings 30 through the channels 60 while the red color ink is cured under a predetermined temperature, thereby uniformly forming the red color layer 50r as shown in FIG. 12B. The green and blue color layers 50g and 50b are formed by the same method as the red color layer 50r, thereby uniformly forming the green and blue color layers 50g and 50b.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A color filter substrate comprising:
    a substrate;
    a light blocking layer on the substrate having a plurality of wells with bottoms that contact the substrate and a plurality of channels between the wells, the depth of the channels being less than the thickness of the light blocking layer; and
    a color layer material which fills the wells and the channels, wherein adjacent wells filled with a same color are connected to one another through one of the channels and each channel is a depression in the light blocking layer.

2. The color filter substrate of claim 1, wherein the wells are arranged in a matrix of rows and columns.

3. The color filter substrate of claim 2, wherein the color layer material in a column of the matrix differs in color from an adjacent column of the matrix.

4. The color filter substrate of claim 2, wherein the color layer material in a row of the matrix differs in color from an adjacent row of the matrix.

5. The color filter substrate of claim 1, wherein the width of the channels is substantially similar to a distance between two adjacent wells.

6. The color filter substrate of claim 1, wherein the depth of the channels is from about 0.1 micrometers to about 1.5 micrometers.

7. A method of fabricating a color filter substrate, comprising:
    forming a light blocking layer on a substrate;
    patterning the light blocking layer to form a plurality of openings through the light blocking layer;
    forming a plurality of channels in the light blocking layer between the openings to allow each of the openings to be connected to an adjacent opening thereto, wherein each channel is a depression in the light blocking layer and the depth of each channel is less than the thickness of the light blocking layer; and
    forming a plurality of color layers on the substrate exposed through the openings and on the channels of the light blocking layer between the openings, each of the color layers connecting the openings arranged in a same line such that the color layers are substantially parallel to each other.

8. The method of claim 7, wherein each of the color layers comprises a different color from that of adjacent color layers thereto.

9. The method of claim 8, wherein the color layers are formed by:
    spraying a color ink onto the substrate exposed through the openings and onto the channels of the light blocking layer between the openings.

10. The method of claim 9, wherein the openings are substantially simultaneously formed with the channels using a single mask.

11. The method of claim 9, wherein the openings are arranged in a matrix shape and the color layers connect the openings arranged either in a vertical direction or in a horizontal direction.

12. A method of fabricating a color filter substrate, comprising:
    forming a light blocking layer on a substrate;
    patterning the light blocking layer to form a plurality of wells through the light blocking layer;
    forming a plurality of channels as depressions in the light blocking layer between the wells, such that the depth of the channels is less than the thickness of the light blocking layer and adjacent wells that are to be filled with a same color are connected to one another through one of the channels; and
    filling each of the adjacent wells and corresponding connecting channels with a color layer material of the same color.

13. The method of claim 12, wherein the wells are arranged in a matrix of rows and columns.

14. The method of claim 12, wherein the color layer material in a column of the matrix differs in color from an adjacent column of the matrix.

15. The method of claim 12, wherein the color layer material is applied by spraying a colored ink onto the substrate exposed by the wells and the channels between the wells.

16. The method of claim 12, wherein the wells and channels are formed together using a single mask.

17. The method of claim 13, wherein the color layer material in a row of the matrix differs in color from an adjacent row of the matrix.

* * * * *